United States Patent Office 3,061,512
Patented Oct. 30, 1962

3,061,512
DERMATOLOGICAL PREPARATION
David W. Anderson, Jr., Darien, Conn., and Joseph F. McDonnell, Jr., Rockville Centre, N.Y., assignors to The Borden Company, New York, N.Y., a corporation of New Jersey
No Drawing. Filed June 25, 1959, Ser. No. 822,726
6 Claims. (Cl. 167—58)

This invention relates to a dermatological preparation and the application of it to pathological skin. The invention is particularly useful in the treatment of diaper rash of infants and will be illustrated principally by description in connection with such use.

Many compositions have been proposed and also used extensively in the treatment of irritation, infection, or exorbations of the skin such as occur in diaper rash. There remains the need of the combination of greater effectiveness and speed of healing, neutralization of alkalinity such as developed by bacterial decomposition of the urea with production of ammonia on the skin of the affected part, and washability so that the treating composition, once applied to the skin, may be removed with water.

It is an object of the invention to provide a composition that meets these requirements and also is soothing to the skin and non-toxic.

Other objects of the invention will appear from the description that follows.

Briefly stated, our invention comprises the herein described composition and process of treating the pathologic condition of the skin. More specifically, the invention comprises the topical application including mixed methionine and amino acids from protein hydrolysis and suitably also cysteine and a skin protecting agent such as talc. The comercial embodiment includes in addition a bactericide, mold preventative, surfactant, and an emollient along with coloring and perfuming agents and such other materials as may be desired for their conventional effects. Water is added in amount to give the proper thickness or consistency to those of our preparations that are to be in the recommended form of oil-in-water emulsions.

The invention includes also the compounding of the necessary components in such manner as to give this oil-in-water type emulsion in which the continuous phase is aqueous and droplets constituting the dispersed phase will include the emollient, sometimes called oily component, and portions at least of the protein hydrolysate, surfactant, and mold inhibitor and the water phase will contain substantial amounts of the other components of the whole mix. When such preparation is applied to the skin, even if allowed to dry, it redisperses readily in wash water.

The composition, when used, on skin disorders of diaper rash has been found effective in giving quick healing without allergic effects, sensitivity or other objectionable side reactions or toxicity in any of a large number of cases treated.

Once these desirable effects have been observed, various explanations may be advanced to explain the causes. We consider that the effect is due in part at least to the favorable anabolic medium provided by the combination of the amino acids of kind described and the protein hydrolysate, promotion of contact and penetration of the active principle or principles to the site of the condition to be corrected, or to the general soothing effect on the irritation.

Materials used are of pharmaceutical grade, i.e. permissible for use on the skin. They must be non-toxic and non-irritating, i.e. in the proportions and under the conditions of use as a topical application.

The methionine used is ordinarily the DL variety although the D or the L alone may be employed.

The cysteine used as a synergistic amino acid may be used as cysteine or in the form of a salt such as the hydrochloride monohydrate.

The protein hydrolysate is the enzyme or acid hydrolysis product of any of the following proteins: lactalbumen, cow's milk casein, soy protein, or mixtures thereof. Other proteins that may be used but are not recommended are zein and gelatin.

In any case the hydrolysate at the time of use should be of ash content below that which, if present, would make the emulsion unstable, as, for example, below 5% and suitably 0%–1%.

As the enzyme to hydrolyze the selected protein we use to advantage pepsin, papain, or trypsin, the one selected being used at its known optimum pH. The enzyme hydrolysate is processed at the end, to inactivate the enzyme, as by heating to a temperature of 160° F. or moderately above.

When acid hydrolysis is used, there is employed any acid that is conventional for the hydrolysis of proteins for pharmaceutical or food purposes. Hydrochloric acid is preferred. There is no advantage in using any of the other nontoxic mineral acids that offsets the disadvantages in their use. The resulting acid hydrolysate may be neutralized and the resulting salt of the alkali separated by any usual process, to reduce the ash content of the hydrolysate on the dry basis to the limit stated above. In alternative procedure, the acidity is removed from the hydrolysate by an ion exchanger with conventional technique.

The protein hydrolysate may be in the form of a compounded mixture of amino acids derived originally from hydrolysis of the selected protein.

A protein hydrolysate, actually here a mixture of natural amino acids, that we have used is the composition shown in the following table, the acids being the L-species.

| Amino acid | Percent |
|---|---|
| Leucine | 75 |
| Isoleucine | 13 |
| Methionine | 8 |
| Phenylalanine | 3 |
| Tyrosine | Trace |
| Ash | 0.03 |

In any case we find it advantageous to use a hydrolysate that in the proportions used is substantially completely soluble in water; dispersible also in the oil phase of our composition as in a mixture of stearyl alcohol, white petrolatum and light mineral oil in approximately equal proportions by weight; and substantially free from unhydrolyzed protein as shown by nonprecipitability from aqueous solution by trichloracetic acid.

The surfactant, mold inhibitor, and emollient may be any materials of these classes that are conventional in skin treating compositions.

As the emollient or oily component we use ordinarily a mixture of about equal parts each, in total proportion of at least 10 parts for 100 total of the said component, of the stearyl alcohol, white petrolatum, and light mineral oil N.F., with or without propylene glycol. In place of the stearyl alcohol we may use cetyl or palmityl alcohol. In place of the petrolatum or the light mineral oil we may use other petroleum fractions of about the same consistencies and melting points. It is necessary that the oil components when mixed together should be so selected in kinds and amounts as to melt at temperatures such as 70° C. at which our preparation is to be compounded.

As surfactants we find particularly satisfactory Myrj 51 (polyoxyethylene stearate such as one having an ethylene oxide content within the range 3–10 moles per mole of the stearate), Span 60 (sorbitan monostearate), and glycerin monostearate, palmitate, or oleate. We can use any other non-ionic surfactant that is of pharmaceutical grade and non-toxic.

As the mold inhibitor we use any mold inhibitor approved for pharmaceutical use. Examples of our mold inhibitors are propyl paraben sold commercially as Tegosept P, the corresponding methyl paraben (Tegosept M), and sorbic acid.

The bactericide used is any one approved for topical application and effective in acid media as at pH 5, for inhibiting growth of *B. ammoniagenes*. Examples of such bactericides that we use are benzalkonium chloride (zephiran chloride), benzethonium chloride, and methylbenzethonium chloride.

The color is any approved pharmaceutical color of acceptable shade that is stable at pH 5. Examples of such colors that we use are F.D. and C. Red No. 1 or No. 2 and Yellow No. 5.

The perfume is any one that gives the desired fragrance, examples being oil of rose geranium, lavender, lilac or the like.

To promote spreading (slip) of the composition and protect the skin to which applied, we use talc in finely divided form although we may use less satisfactorily other inert powders such as clay, kaolin, bentonite, fuller's earth or zinc stearate.

The proportions of materials may be varied over considerable ranges depending in part upon the particular components selected and the consistency desired in the finished product. The following table shows permissible ranges for each class of materials and a range recommended for commercial use. In this table and elsewhere herein proportions are expressed as parts by weight on the commercially dry basis unless specifically stated to the contrary.

| Component Used | Parts for 100 of Whole Preparation, dry basis | |
|---|---|---|
| | Permissible | Commercial |
| Methionine added | 0.4– 5 | 1– 4 |
| Cysteine | 0.05– 1 | 0.1–0.8 |
| Protein hydrolysate | 1– 6 | 1.5– 4 |
| Emollient, total | 30–85 | 60– 80 |
| Surfactant | 5–25 | 15– 20 |
| Mold inhibitor | 0.02– 3 | 0.04– 2 |
| Bactericide | 0.1– 2 | 0.2– 1 |
| Talc (or like protecting agent) | 0–30 | 5– 20 |
| Acid or alkali to make pH about | 4– 6 | 4.5–5.5 |
| Water, to give consistency desired. | | |
| Colors and perfumes, as desired. | | |

It is particularly desirable to add the acid as a salt of the amino acid when the latter is otherwise insoluble in the proportion used in the water of our preparation.

It will be noted that the amounts of methionine and cysteine are stated as those added as such. They do not include the additional methionine or cysteine that may be introduced in the protein hydrolysate.

The proportion of cysteine, when introduced as a salt such as the hydrochloride, is selected within the range stated to establish the proper pH of the whole composition for topical application. This pH may vary somewhat, as between 4–6, although about 5 is the most satisfactory level. If the amount of cysteine hydrochloride added in a mix is above that giving the desired pH, then the composition is back-neutralized in part by the addition of an alkali to the pH range stated, sodium and potassium hydroxides being examples of alkalies suitable for this purpose.

The protein hydrolysate is selected in amount to give the consistency desired in the finished product in conjunction with the proportion of water and the other materials. In the lotion form of our composition, the amount of hydrolysate used is that which will dissolve in the water content when cold, that is, not above about 3–5 parts for 100 of the water. In the cream, on the other hand, some of the hydrolysate may remain suspended in the cream in undissolved condition and can be above 3 parts, as up to the 6 parts stated.

For best results, we use 1–10 times and commercially 2–6 times as much of the hydrolysate as of the total weight of methionine andl cysteine.

In the creams we use ordinarily about 50–150 parts of water for 100 dry weight of all components. For the lotion we use about 250–500 and ordinarily 300–400 parts of the water for 100 of dry components.

In compounding our preparation we ordinarily mix the water soluble materials with water and separately the water insoluble materials and then emulsify the two mixtures with each other. The powdered protecting agent such as talc may be added to either phase and ordinarily to the water mix. The protein hydrolysate is mixed in the oily components and becomes suspended in the oil phase which forms the ultimate droplets in the finished oil-in-water emulsion.

The conditions of compounding and other features of the invention are illustrated in greater detail in the specific examples that follow.

*Example 1*

A diaper rash cream was made of the following composition.

| Oil phase: | Parts, dry weight |
|---|---|
| Stenol (stearyl alcohol) | 19 |
| Petrolatum, white | 28 |
| Mineral oil light | 28 |
| Protein hydrolysate | 3 |
| Myrj 51 | 14 |
| Span 60 | 5.2 |
| Tegosept P | 0.3 |

| Water phase: | Parts by weight |
|---|---|
| Water | 96 |
| Methionine | 1.2 |
| Cysteine·HCl·H$_2$O | 0.1 |
| Zephiran chloride | 0.4 |
| Tegosept M | 0.3 |
| Color: F.D. and C. Red #1 Soln. (2 oz./gal. water) | 0.2 |
| Perfume | 0.3 |

The protein hydrolysate here used is the material of the amino acid analysis tabulated above.

The ingredients shown under "Oil phase" were mixed in a 40 gallon tub and warmed carefully to 70° C., at which temperature all of the components were liquid or dissolved except the protein hydrolysate. This was intimately suspended in the warmed material.

In making the water phase, the water, methionine, cysteine hydrochloride monohydrate, and Tegosept M were mixed in another vessel and warmed also to approximately 70° C. Then the zephiran chloride in water solution was added and the whole mixed thoroughly.

The water phase so made was then added slowly, and with stirring to the mixed and warmed oil phase materials and the mixing continued for approximately 10 minutes until a uniform oil-in-water emulsion resulted. Then the color was introduced and stirring continued until the cream cooled to approximately room temperature, so as to avoid volatilization of the perfume to be added. The perfume was then added at a temperature of about 25° C. The whole emulsion so made was strained through a screen and filled into the containers. It was of the oil-in-water type and stable on standing.

This final cream had a pH within the range 5.1–5.6 and a penetration test of 23–30 mm. by ASTM standard method. It was effective as a treatment for diaper rash and like conditions of the skin. Tested in the agar-agar test plate technique, it was found to be effective as a bactericide against *E. coli*, *Staph. aureus*, and *B. ammoniagenes*.

Example 2

A lotion for use as a diaper rash was prepared of the following composition.

| Component: | Parts for 100 dry weight |
|---|---|
| Stearyl alcohol | 18 |
| Petrolatum | 18 |
| Mineral oil, light | 18 |
| Propylene glycol | 18 |
| Myrj 51 | 14 |
| Span 60 | 4.5 |
| Water | 200 |
| Protein hydrolysate (as in Example 1) | 5 |
| Methionine | 3 |
| Cysteine·HCl | 1 |
| Color and perfume, total of both | 0.5 |

Example 3

A dry powder for the uses stated is made by thoroughly mixing in dry condition the following:

| | Parts |
|---|---|
| Protein hydrolysate | 5 |
| Methionine | 3 |
| Cysteine·HCl | 1 |
| Benzethonium chloride | 0.1 |
| Color and perfume, total | 0.5 |
| Talc, fuller's earth, zinc stearate, bentonite, clay, or kaolin | 91.4 |

The product is finely milled, to reduce the whole mix to a fine powder. It is then sieved. The product through the screen is ready for application to the skin.

Example 4

The procedure and composition of Example 1 are used except that the cysteine hydrochloride is omitted and hydrochloric acid is substituted therefor in amount to make the pH of the whole mix 5.

The product of this example is useful on the skin but is not as satisfactory for all the purposes stated as the whole composition including the cysteine hydrochloride of Example 1.

Example 5

The procedure and composition of any of the Examples 1-4 are followed with the addition of any one or more of the components listed below in the proportions shown and for the purpose stated.

| Components: | Parts |
|---|---|
| Oil of cade (antipruritic) | 4 |
| Coal tar (antipruritic) | 4 |
| Liquor carbonis detergens (antipruritic) | 10 |
| Neomycin and its salts (antibiotic) | 1 |
| Menthol (cooling and antipruritic agent) | 1 |
| Hydrocortisone and its salts or Burow's solution (aluminum acetate, antiinflammatory) | 1.2-5 |
| Vioform (iodochlorohydroxyquinoline) (antibacterial) | 2 |

It will be understood that it is intended to cover all changes and modifications of the examples of the invention herein chosen for the purpose of illustration which do not constitute departures from the spirit and scope of the invention.

We claim:

1. A dermatological preparation prepared for treatment of diaper rash comprising a substantially water soluble hydrolystate of a protein selected from the group consisting of lactalbumen, milk casein, soy protein, zein and gelatin, the amino acids methionine and cysteine, an oily component of melting point as low as approximately 70° C. constituting the emollient, a quaternary ammonium compound serving as a bactericide effective in acid media, a nonionic surfactant, and water, the protein hydrolysate being dispersed in the emollient, the resulting mixture being emulsified in a solution of the other components in the water, the pH of the resulting emulsified mixture being about 4-6, and the proportions by weight on the dry basis being about 0.4-5 parts of methionine in addition to any content thereof in the protein hydrolysate, 0.1-1 part of cysteine and 1-6 parts of the said hydrolysate for 100 parts dry weight of the said preparation and about 1-10 parts of the said hydrolysate for 1 part total of methionine and cysteine.

2. The preparation of claim 1, the cysteine being in the form of an acidic salt.

3. The preparation of claim 1, the said hydrolysate being the hydrolysate of a soy protein.

4. The preparation of claim 1, the said hydrolysate having an ash content not above about 5%.

5. The preparation of claim 1, including powdered talc admixed in the proportion of 5-25 parts for 100 parts of the said preparation.

6. In the treatment of diaper rash, the process which comprises the application of the composition of claim 1 to the skin affected by the rash.

References Cited in the file of this patent

UNITED STATES PATENTS

| 2,180,637 | Kemmerer | Nov. 21, 1939 |
| 2,666,013 | Ferguson | Jan. 12, 1954 |
| 2,843,522 | Mahon | July 15, 1958 |

OTHER REFERENCES

British Med. J., October 1940, page 518.

Tice: Am. J. Pharmacy, September 1946, p. 318.

Fridenson: The Perf. and Ess. Oil Rev., vol. 42, February 1951, pp. 42-3.

Deakers: Drug and Cosmetic Industry, 40:2, February 1937, pp. 206-207, 212, 213.